Dec. 2, 1924.
P. H. SPENCER
1,517,806
AUTOMOBILE SEAT SHOCK ABSORBER
Filed May 21, 1923
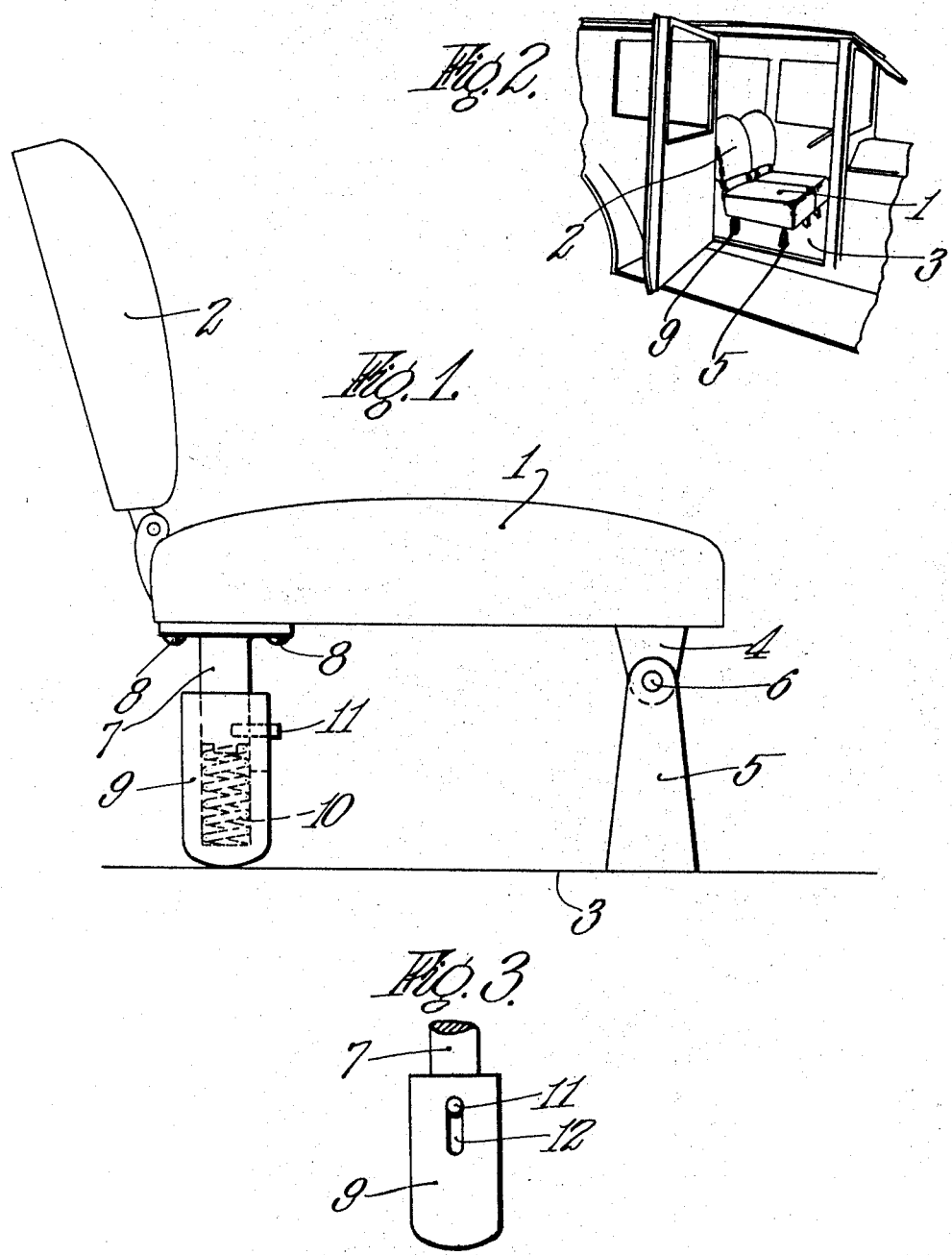
INVENTOR
Percival H. Spencer
BY
Chapin Neal
ATTORNEYS Patented Dec. 2, 1924.

1,517,806

UNITED STATES PATENT OFFICE.

PERCIVAL H. SPENCER, OF HARTFORD, CONNECTICUT.

AUTOMOBILE SEAT SHOCK ABSORBER.

Application filed May 21, 1923. Serial No. 640,560.

*To all whom it may concern:*

Be it known that I, PERCIVAL H. SPENCER, citizen of the United States, residing at Hartford, in the county of Hartford and State of Connecticut, have invented new and useful Improvements in Automobile Seat Shock Absorbers, of which the following is a specification.

This invention relates to a cushioning or shock absorbing device for an automobile chair seat. It is particularly adapted for use in combination with a hinged or folding seat such as is now being provided in a great many automobiles of the enclosed type where the front seat is divided.

One object of the invention is to provide a very simple and inexpensive device to cushion or absorb the vibrations which are transmitted to an individual automobile seat by the frame or chassis thereof. Heretofore automobiles have been constructed with different types of shock absorbers operating to cushion the contraction and expansion of the chassis springs but the seats themselves have been provided with only the usual springs which are customary in any type of an upholstered chair. My device provides a still further cushioning for the occupant of a seat equipped with it and it is of such a character that it greatly relieves a large part of the jar and discomfort which is prevalent in all automobiles, due to an uneven road or to a sudden change in the speed of the machine.

Further objects and advantages will appear in the following detailed description and drawings which show a preferred embodiment of my invention and in which—

Fig. 1 is a side view of a folding chair seat with my device attached thereto; and Fig. 2 is a perspective view of a portion of an enclosed automobile showing a folding seat equipped with the shock absorber; and Fig. 3 is a detail side view of a lower portion of the absorber, taken from the front.

Referring to the drawings 1 represents an automobile seat having a folding back rest 2 and 3 designates the floor or chassis of the machine. At the front edge of the seat 1 there are provided eye brackets which fit into supports 5 having recessed yokes and are secured thereto by means of pins 6. The supports 5 are fixed to the floor or chassis 3 in any suitable manner as is usual in automobile construction. There is thus provided a very rigid hinged front support for the seat allowing same to be folded forwardly in a convenient manner.

For the rear support when the seat is not folded up I have devised a novel construction which is extremely advantageous and beneficial to the occupant. A plunger 7 is secured preferably at the center of rear edge of the seat 1 by means of screws 8 and fits into a socket 9. Interposed between the lower end of plunger 7 and the bottom of the socket 9 there is a coiled spring 10. The plunger 7 and socket 9 are adapted to telescope upon each other and are provided with a pin 11 and slot 12 to limit the relative movement therebetween. The lower end of the socket 9 is rounded as shown in the drawings to provide an even point of contact with the floor 3 when the device is in operation.

It is obvious that the coiled spring 10 will cushion all of the jars and vibrations which are imparted to the socket 9 thereby relieving in a great degree the jars, which would normally be transmitted to the spine of the occupant of the seat. At the same time the hinged support at the front edge allows the telescoping of the socket and plunger upon one another without changing the distance from the front edge of the seat to the floor of the automobile and consequently the leg reach of the occupant remains the same during the cushioning movement of said seat.

While I have described and shown a preferred embodiment of my device it is understood that the scope of the invention is defined by the appended claim:

The combination with an automobile of a seat therefor, having a hinged back rest arranged to be folded on said seat, upright front supports for said seat fixedly secured to the floor or chassis of the automobile, hinged connections between said supports and the front edge of said seat to permit folding of said seat forwardly, said supports and connections acting to secure said seat to said automobile, and a cushioning support fixed to the rear edge of said seat for being carried therewith in the forward folding movement of said seat and arranged to rest freely on said floor, said cushioning support comprising a plunger and a telescoping socket with an interposed spring housed in said socket, together with means to limit the relative movement between said plunger and socket.

In testimony whereof I have affixed my signature.

PERCIVAL H. SPENCER.